(12) United States Patent
Alwis

(10) Patent No.: US 11,379,927 B1
(45) Date of Patent: Jul. 5, 2022

(54) SYSTEM AND METHOD FOR THE MANAGEMENT OF LIABILITY RISK SELECTION

(71) Applicant: Athula Alwis, Belle Meade, NJ (US)

(72) Inventor: Athula Alwis, Belle Meade, NJ (US)

(73) Assignee: AllDigital Specialty Insurance, Princeton, NJ (US)

( * ) Notice: Subject to any disclaimer, the term of this patent is extended or adjusted under 35 U.S.C. 154(b) by 0 days.

(21) Appl. No.: 17/204,855

(22) Filed: Mar. 17, 2021

Related U.S. Application Data

(60) Provisional application No. 62/990,833, filed on Mar. 17, 2020.

(51) Int. Cl.
*G06Q 40/00* (2012.01)
*G06Q 40/08* (2012.01)
*G06F 16/25* (2019.01)

(52) U.S. Cl.
CPC ............. *G06Q 40/08* (2013.01); *G06F 16/25* (2019.01); *G06Q 2220/00* (2013.01)

(58) Field of Classification Search
USPC ........... 705/4, 5, 30, 39; 726/1, 25; 715/700, 715/704, 753; 707/793; 719/328; 717/108; 709/226, 227, 217, 218; 700/236; 706/25
See application file for complete search history.

(56) References Cited

U.S. PATENT DOCUMENTS

| | | | |
|---|---|---|---|
| 8,930,269 B2 | 1/2015 | He | |
| 9,830,663 B2 | 11/2017 | Roberts | |
| 10,482,538 B1 | 11/2019 | White | |
| 10,510,120 B1 | 12/2019 | Roll | |
| 10,664,920 B1 | 5/2020 | Roll | |
| 10,679,296 B1 * | 6/2020 | Devereaux | ........... G06V 20/176 |
| 10,846,485 B2 | 11/2020 | Bacarella | |

(Continued)

OTHER PUBLICATIONS

Mitigating Risk with Cyberinsurance; IEEE Security & Privacy (vol. 13, Issue: 6, pp. 38-43); Per Hakon Meland; Inger Anne Tondel; Bjornar Solhaug; Nov. 1, 2015.. (Year: 2015).*

(Continued)

*Primary Examiner* — Tien G Nguyen
(74) *Attorney, Agent, or Firm* — Benjamin Appelbaum

(57) ABSTRACT

A system and method to manage liability risk selection in the Small-to-Medium Enterprises business sector facilitates the insurance underwriting and delivery process using a combination of blockchain and Artificial Intelligence technologies. The approval process and the insurance rates are determined using a process that analyzes the answers of potential insureds in response to a set of questions designed by insurance experts to evaluate the performance and the value of the potential insured's organizations. The system also obtains information from social media and news data relating to the businesses of the potential insureds. The system enables an insurance broker to provide real time product delivery and collaboration through a private permissioned blockchain platform. The system and method provide a comprehensive and unique insurance underwriting and policy delivery solution that provides stable rates and rapid turnaround, in several minutes compared to several weeks using conventional insurance underwriting processes.

15 Claims, 5 Drawing Sheets

(56) References Cited

U.S. PATENT DOCUMENTS

| | | | |
|---|---|---|---|
| 10,878,512 B1* | 12/2020 | Al-Zoubi | H04L 9/3239 |
| 10,943,302 B2 | 3/2021 | Haile | |
| 2002/0002475 A1* | 1/2002 | Freedman | G06Q 40/02 |
| | | | 705/4 |
| 2018/0350451 A1* | 12/2018 | Ohnemus | G06Q 30/0236 |
| 2019/0057454 A1 | 2/2019 | Komenda | |
| 2019/0114714 A1* | 4/2019 | Jones | G06Q 40/08 |
| 2019/0303933 A1 | 10/2019 | Lindsay | |
| 2020/0020038 A1* | 1/2020 | Haile | H04L 9/3236 |
| 2020/0294152 A1 | 9/2020 | Fletcher | |
| 2020/0357075 A1 | 11/2020 | Dahl | |
| 2021/0272209 A1 | 9/2021 | Williams | |

OTHER PUBLICATIONS

The Exploration for Using E-commerce Platform to Optimize Insurance Business; 2012 International Conference on Management of e-Commerce and e-Government (pp. 191-196); Erhao Zhong, Cuncong Zhong, Huijuan Yang; Oct. 20, 2012. (Year: 2012).*

Openchain, Blockchain Technology For The Enterprise, downloaded from the Internet on Dec. 16, 2019, from https://www.openchain.org/.

ChainThat, Chain That (RTM) Real Solutions Real Efficiency, downloaded from the Internet on Oct. 30, 2019, from https://www.chainthat.com/solutions.

Katesh, What is Human-in-the-Loop for Machine Learning, Jul. 16, 2018, downloaded from the Internet on Sep. 9, 2019, from https://hackernoon.com/what-is-human-in-the-loop-for-machine-learning.

Wikipedia, Human-in-the-loop, last edited on May 16, 2019, downloaded from the Internet on Sep. 9, 2019, from https://en.wikipedia.org/w/index.php?title=Human-in-the-loop&oldid=897405269.

Vilar, Henry, Anti-fraud firm BlockClaim completes Euro500k seed funding, Jun. 17, 2019, downloaded from the Internet on Aug. 9, 2019 fro https://www.fintechfutures.com/2019/06/anti-fraud-firm-blockclaim-completes-500k-seed-funding.

Zanzotto, F.M., Viewpoint: Human-in-the-loop Artificial Intelligence, J. Artificial Intelligence Research 64:243-252, published Feb. 2019.

Huckster, R., Lemonade Are Live, Insurance Will Never Be The Same Again, The Digital Insurer, Issue 56, Issue Date Dec. 9, 2016, downloaded from the Internet on Aug. 8, 2019, from https://www.the-digital-insurer.com/blog/insurtech-lemonade-are-here-and-insurance-will-never-be-the-same-again.

* cited by examiner

SYSTEM AND METHOD FOR THE MANAGEMENT OF LIABILITY RISK SELECTION

CROSS-REFERENCE TO RELATED APPLICATION

This application claims the benefit of U.S. provisional patent application Ser. No. 62/990,833, filed 17 Mar. 2020, by the present inventor, and whose contents are incorporated by reference herein in their entirety.

FIELD OF THE INVENTION

Embodiments of the present invention relate to the process of underwriting insurance policies in the commercial market, in which the time required to rate, quote and bind a typical small company management liability policy can be reduced from a period ranging from 4-6 weeks to a shorter period of approximately 2-10 minutes. Additionally, embodiments of the present invention can reduce the customer experience when applying for small company management liability insurance, reducing a multi-page, 40 question application to a single page application with about 10-12 questions. Embodiments of the system could be used for either private or publicly-owned companies. The system utilizes a combination of artificial intelligence and blockchain technology to achieve this rapid response time after the answers from a standardized questionnaire have been entered into the system.

BACKGROUND OF THE INVENTION

The underwriting process for insurance can be a long and drawn out process, depending upon the type of insurance being sought and the proposed insured. In the consumer market, a policy for automobile insurance can generally be underwritten within a day, and many companies are now offering insurance through online portals in which coverage can be obtained rapidly upon answering a few questions. In the commercial market, the time frame for a commercial insurer to rate, quote and bind a typical management liability policy can range from a period of from 4-6 weeks, and sometimes even longer. This time period starts after the proposed insured has completed a multi-page (around 10 pages), multi-question application (around 40 questions), and where many of the questions include several sub-parts. Next, the underwriting process can be considered to have two elements, or phases, the first phase being the decision-making process, and the second phase being the delivery process, that is, the steps of getting the approved policy to the proposed insured.

As will be seen in an embodiment of the present invention, both of these steps are facilitated through the use a brief, often a single page application, containing a standardized series of questions, which is completed, either by the proposed insured, or a broker for the proposed insured. It is anticipated that this questionnaire, which will generally comprise 10 questions, can be completed within a few minutes. The data from the questionnaire is entered into the system, and within a few minutes an insurance price quote can be generated, and delivered to the proposed insured.

BRIEF SUMMARY OF THE INVENTION

The underwriting process can be considered to have two elements, or phases, the first phase being the decision-making process, and the second phase being the delivery process, that is, the steps of getting the approved policy to the proposed insured.

For the last 300 years, the insurance underwriting process (risk selection) has been a manual task performed by humans with a comprehensive knowledge of insurance coverages and an understanding of risk vs. reward in conducting insurance. The key breakthrough in our approach is the recognition that for small companies within the United States, the technical problem of the Management Liability risk selection process can be transformed into a pattern recognition problem. The solution to this problem is provided by embodiments of the system of the present invention, that employ an Artificial Intelligence system.

Embodiments of the present invention include a system and method to manage liability risk selection in the Small-to-Medium Enterprises business sector that facilitates the insurance underwriting and delivery process using a combination of blockchain and Artificial Intelligence technologies. The approval process and the insurance rates are determined using a process that analyzes the answers of potential insureds in response to a set of questions designed by insurance experts to evaluate the performance and the value of the potential insured's organizations. The system also obtains information from social media and news data relating to the businesses of the potential insureds. The system enables an insurance broker to provide real time product delivery and collaboration through a private permissioned blockchain platform. The system and method provide a comprehensive and unique insurance underwriting and policy delivery solution that provides stable rates and rapid turnaround, in several minutes compared to several weeks using conventional commercial insurance underwriting processes for management liability insurance.

One embodiment of the present invention is a method for the management of risk selection. The method comprises the steps of:

inputting an application for insurance for a proposed insured into a node of a computer system, the computer system comprising a plurality of databases of properties of known insureds, the application comprising a plurality of data relating to the proposed insured;

comparing the plurality of data relating to the proposed insured to a plurality of data comprising risk factors and risk levels;

determining the risk level for the proposed insured, based upon the inputted application; and determining whether to offer an insurance policy to the proposed insured, wherein the computer system further comprises:

a plurality of nodes that are input sources;

a plurality of insurance company computer systems, the insurance company computer systems being in electronic communication with one or more of the nodes;

a plurality of broker company computer systems, the broker company computer systems being in electronic communication with one or more of the nodes; and wherein the plurality of databases further comprises:

a database comprising information specific to one or more insurance companies;

a database comprising information specific to one or more businesses other than insurance companies;

a database comprising a plurality of risk factors and risk classes, the risk classes being determined by a range of amounts previously paid to an insured, the risk classes being defined as low risk, medium risk, and high risk, the low risk class characterized by the lowest range of payments, the high risk class characterized by the highest range of payments made to an insured, and the medium risk class characterized by a range of payments that are between the payments of the low risk class and the high risk class;

a database comprising a plurality of business characteristics;

a database comprising a plurality of claims data;

a database comprising a plurality of insureds data;

a database comprising a plurality of pricing data;

a database comprising a plurality of actuarial information;

a database comprising a plurality of newspaper data;

a database comprising a plurality of business publications data;

a database comprising a plurality of public source data; and a blockchain for data storage.

In addition, the method further comprises utilizing a plurality of computers, the plurality of computers being in real time electronic communication with each other, the electronic communication being either a wired or a wireless connection, and with one or more of the connections selected from the group consisting of an electronic network, a direct connection to the insurance company computer, the world wide web, the Internet and a virtual private network ("VPN").

DETAILED DESCRIPTION OF THE INVENTION

Figure 1:
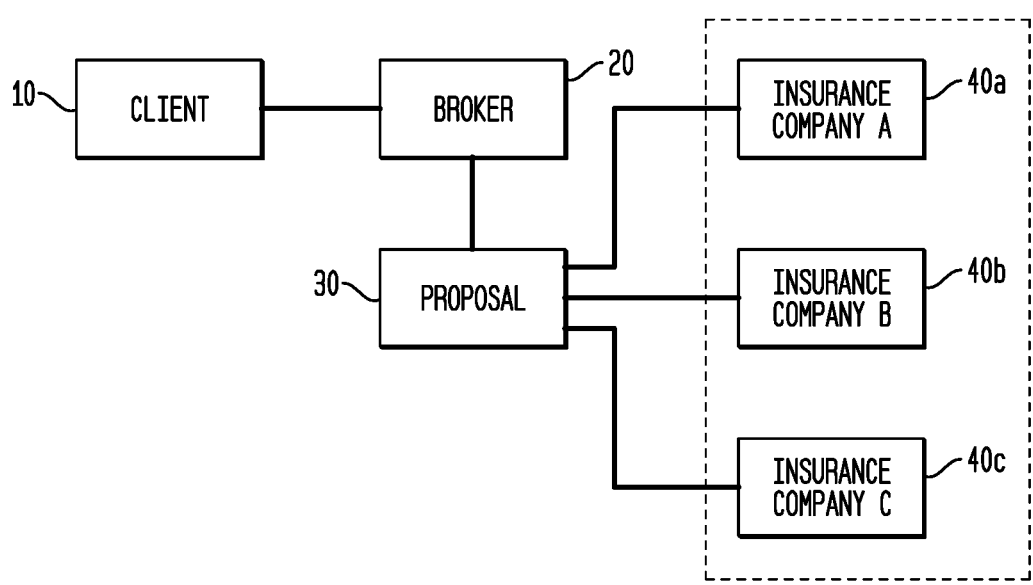
FIG. 1 is a schematic representation of a standard insurance underwriting process.

An overview of a typical insurance underwriting process is shown schematically in FIG. 1. This represents the first phase of underwriting, that is, the decision-making process. The second phase, the delivery process, will be discussed later in this disclosure. A client 10 (also referred to as a proposed insured) contacts an insurance broker 20 to obtain insurance for a commercial undertaking, such as a business. After discussing his needs with broker 20, and determining the type of and coverage amounts for the business, the client 10, either with or without the assistance of the broker 20, completes an application for insurance. The application is then submitted to one or more insurance companies 40a-40n for review. The application could be a paper document submitted either by courier, mail, facsimile or other method of communication, or could be an on-line electronic questionnaire, which is completed electronically and submitted electronically.

The broker 20 could be an individual insurance broker, such as an insurance agency or salesman, or could represent a broker company, which has relationships with one or more insurance companies. The broker 20 could also be a reinsurance company.

Currently, an insurance application would be submitted to the insurer electronically, by either scanning the paper application into an electronic format, or preparing the application by entering the client's information directly into a computer, and then transmitting either the scanned application, or the completed application, to the insurance company in real time over an electronic network, such as the world wide web, a direct connection to the insurer, a virtual private network ("VPN") or through the Internet. Although only three insurance companies 40a, 40b and 40c are shown in FIG. 1, it is to be understood that these insurance companies could be representative of multiple insurance carriers. Depending upon the type and amount of insurance being sought by the client 10, the broker 20 may submit the application to one or more insurance carriers, based upon factors such as, but not limited to, the reputation of the insurer, the industries for which a particular insurer would underwrite insurance and affiliations of the broker. In general, the insurance company and the broker companies will be selected from U.S. domestic companies, but could also include companies that are headquartered overseas; the companies can be either public or privately owned.

Figure 2:
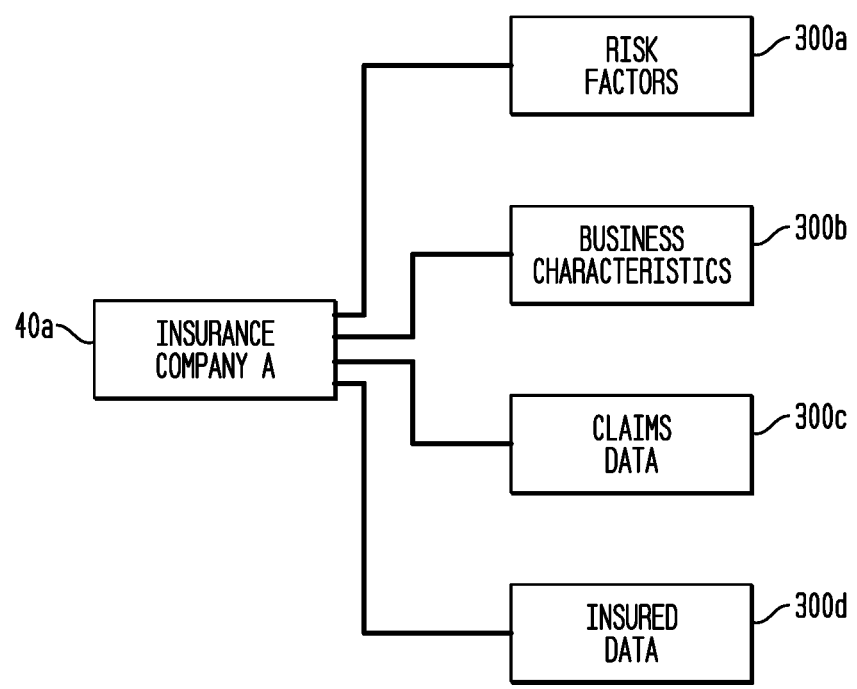
FIG. 2 is a schematic representation of an insurance company underwriting platform.

Once the application has been uploaded into the system of one or more of the insurance carriers 40a-40n, the underwriting process starts, and involves a comparison of data of the insurance application with data contained in one or more databases 300a-300n of the insurance carrier (see FIG. 2). These databases 300a-300n may include information that is proprietary to that insurance carrier, such as Risk Factors 300a, Business Characteristics 300b, Claims Data 300c, Insureds' Data 300d, Public Source 300e, as well as an accumulation of data from public sources, such as newspapers or business publications or the like, that pertain to determining what is considered to be a high risk, moderate risk, or low risk, and determining whether to accept, review, or reject the proposed insured. Many of these evaluations are done by the insurance carrier, and include evaluation of the application by underwriters who have experience in the particular types of insurance for which coverage is being sought. In these determinations, where the decision-making process is done manually, it is the human underwriter who determines the type of risk presented by the proposed insured. This is when the underwriter reviews the process, and, drawing upon the underwriter's experience, determines whether to accept or reject the application, or if accepting the application, to assign a higher premium to the applicant than had the applicant been considered as a "low risk". In some instances, the underwriter may request further information from the broker about the proposed insured, and reevaluate the risk posed by the proposed insured based upon the additional information. A decision to insure the proposed insured, including coverage limits, terms of coverage and premiums, is submitted to the broker for communication to the client, and insurance bound upon payment of an initial premium.

The risk classes are generally determined by a range of amounts previously paid to an insured, the risk classes being defined as low risk, medium risk, and high risk, the low risk class characterized by the lowest range of payments, the high risk class characterized by the highest range of payments made to an insured, and the medium risk class characterized by a range of payments that are between the payments of the low risk class and the high risk class.

The databases 300a-300n of the insurance carrier could reside on one or more servers, a cloud-based system, running on software either proprietary to the insurance carrier (for example, legacy WINS systems), or furnished through a third party such as, but not limited to, AMAZON WEB SERVICES® ("AWS") (Registered trademarks of Amazon Technologies, Inc., Seattle, Wash. for provision of computer application services), or Microsoft AZURE® (Registered trademark of Microsoft Corp., Redmond, Wash. for computer software for data storage and backup, and cloud hosting computer services). A known issue within the insurance industry is that the data residing on the various legacy computer systems employed by the insurance carriers is not always accurate, in part because information is input into different systems by different personnel, and not cross-checked for accuracy. Although not shown in FIG. 2, it is to be understood that these databases 300a-300n could be accessed from one or more of a plurality of computers, tablet devices, smartphones, computer terminals, network nodes or the like, using either a wired or wireless connection, or combinations thereof.

Figure 3:
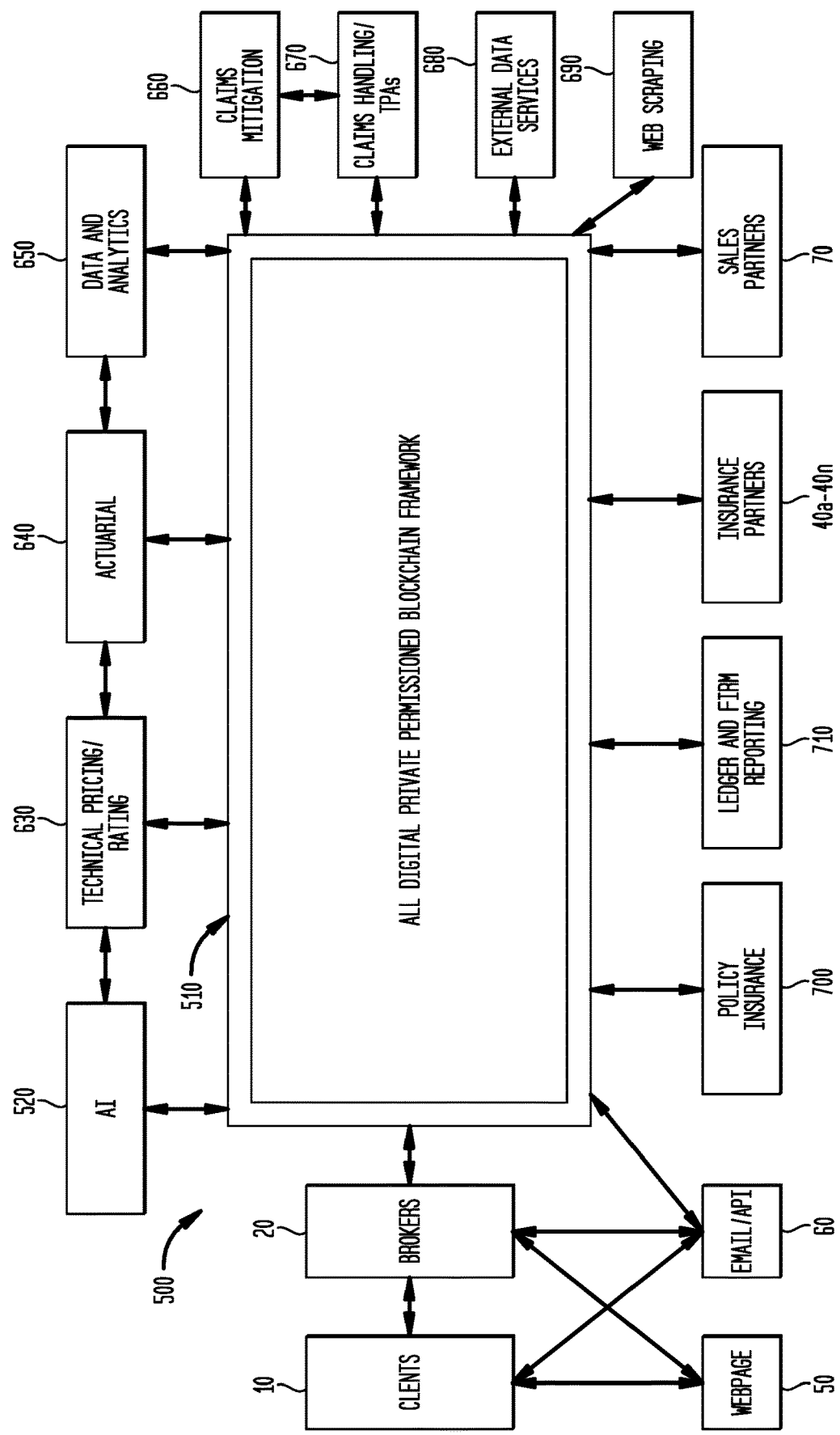
FIG. 3 is a schematic representation of an embodiment of the system of the present invention.

An embodiment of the system 500 of the present invention is shown in FIG. 3, with the addition of the Artificial Intelligence Platform 520 and the blockchain framework 510 to the underwriting system shown in FIG. 1. The clients 10 and brokers 20 are involved in the system 500, although depending upon how a client may choose to interact with the system, the broker 20 may be bypassed and omitted from the system 500, or the role of the client 10 may be bypassed and replaced by the broker 20. (See the interaction of clients 10, brokers 20 and the webpage 50 and e-mail/link to URL platforms 60 and their interaction with the blockchain framework 510).

In some embodiments, the system is intended to rate, quote and bind a typical management liability policy for a small, private company, typically with annual revenues ranging from $10-20 million. Other embodiments could be used for private companies of larger size (for example, those with annual revenue equal to $100 million or greater), or for publicly owned companies.

Referring to FIG. 3, the insurance company systems 40a-40n are replaced by a blockchain framework 510. In the embodiment shown, the blockchain framework 510 is a private and permissioned framework, meaning that it is a private network, and only accessible to those users who have the authorization and/or permission to access the network. In alternate embodiments of the present invention, the blockchain framework 510 can be an open network, with access provided to those who receive permission from the network, or who become qualified to access it after undergoing a registration process. This private, permissioned blockchain framework is different from the more public blockchain frameworks that are used to power other blockchains such as those that operate the various cryptocurrencies, such as BITCOIN, ETHEREUM and the like.

A blockchain is more commonly known as a distributed ledger, and no one computer (or node) on the network contains its' entire content. Because a blockchain employs a two key system (having both a public key and a private key), a blockchain is considered to be a cryptographically secure architecture that is believed to be secure from hackers or other malicious actors. A blockchain architecture is also considered to be transparent, and immutable, enabling one to always be certain that the data residing on a particular blockchain platform is accurate, complete, and uncorrupted.

In the Figures, the various arrows seen going back and forth between components of the system 500 indicate the direction of information/data flow, and that, for example only, data can flow between a client 10 and broker 20, or that information may flow from a client 10 to a webpage 50, and then from the webpage 50 to a broker 20 and into the blockchain framework 510.

Webpage/User Interface

A webpage 50 can refer to the website of the client themselves, the broker, an insurance company, or other third party not explicitly cited in this specification, but which the client 10 may access and review during the process of obtaining insurance coverage. If the webpage 50 is that of a broker 20, the webpage 50 may provide information about the services of the broker, company (or companies) the broker represents, a "contact us" page to enable a user to request further from a broker, carrier or other party, or other way for the broker and client to communicate further about insurance or the insurance process. Because of the interactive nature of a webpage and websites, they also function as a user interface, enabling the user to interact directly with webpage (or company) personnel. A detailed description of the possible types of information available from any one webpage or website, either alone or in combination, can be almost infinite, and is beyond the scope of the present specification.

E-Mail/Link to a URL

This component 60 of the system refers to the use of electronic mail ("E-mail") or linkage to a Uniform Resource Locator ("URL") of a webpage, and these are a way in which the parties can communicate with one another. Electronic mail can be a service such as that provided through a program such as Microsoft OUTLOOK® (Registered trademark of Microsoft Corp, Redmond, Wash. for computer programs for providing enhanced electronic mail and scheduling capabilities), or mail systems such as GMAIL® (Registered trademark of GOOGLE, Inc., Mountain View, Calif. for communications services), Hotmail, YAHOO! or by other Internet Service Providers, or can be a proprietary message system, accessible through the link provided to the URL.

As shown in FIG. 3, the interactions involving webpages 50, electronic mail and links 60 are intended primarily for use among the clients 10 and brokers 20, although there may be some communication by e-mail or through a link 60 with the blockchain framework 510.

Artificial Intelligence

The Artificial Intelligence ("AI") platform 520 will be described in greater detail further in this specification, and, as shown in FIG. 3, is a platform that interacts with the blockchain framework 510 for the insurance underwriting process. The AI platform 520 is in communication with one or more additional components of the system 500, such as a database 630 containing information relating to technical pricing of insurance, and/or in conjunction with rating information, actuarial information 640, and analytics for various types of data 650.

Other Components of the Insurance Underwriting System

In addition to actuarial information 640 and analytics 650, Claims Mitigation and Risk Control 660, Claims Handling and Third Party Administrators ("TPA") 670, External Data Services 680 (external sources) and Web Scraping 690 and the interactions thereof, are sources of additional information that may be entered into the blockchain framework 510 in order to assess the risk posed by the potential insured, managing and servicing claimants in a timely manner, and to use in determining a rate that will be appropriate to the risk presented by the client 10.

The Mitigation and Risk Control 660, and Claims Handling 670 components may be proprietary to one or more of the insurance companies 40 that is(are) underwriting insurance for the proposed insured, and may be elements of the databases shown in FIG. 2.

Third Party Administrators ("TPA") 670 may be anyone else with whom the broker 20 or an insurance company 40a-40n has a relationship with, such as a Claims Management Service.

Web scraping as used herein refers to the use of search services that will query the world wide web or the Internet and search for specific information, in response to a query. An example would be a search of data in all of the newspapers published in a particular state and concerning news about "Company X". Depending upon the age of the proposed insured, the scope of the search may be limited to a specific number of years, or directed to a principal of the proposed insured if the proposed insured is a newly formed organization. The types of data retrieved can include text, photographs, video recordings, or other types of website content. Data obtained through the web scraping process will be reviewed for its accuracy throughout the process. In the initial phases of deployment of the system of the present invention, accuracy will be checked at periodic intervals, and, as the system develops and matures, and the accuracy is considered to be more reliable, the frequency of accuracy checking will decrease.

The input from the insurance partner(s) 40a-40n (i.e., the one or more insurance companies from which insurance proposals are being sought), and where necessary because of the amounts involved, reinsurers, is a part of the blockchain framework 510, and the weight to be given to their input is a factor involved in the underwriting decision, in addition to the risk assessment and analytics data.

Another problem with the current insurance underwriting process is the manual performance of various tasks, such as associating a particular claim with a specific insurance policy, as well as identifying specific policies by policy number, and by claim number. These problems are also addressed, and resolved by embodiments of a system of the present invention.

One of the final steps in the underwriting process of FIG. 3 is the step of policy issuance, also previously referred to as the delivery phase. Once all of the data input and/or obtained by the blockchain framework 510 has been analyzed, a proposal generated and accepted by the client, 10, a policy of insurance is issued at 700.

Figure 4:
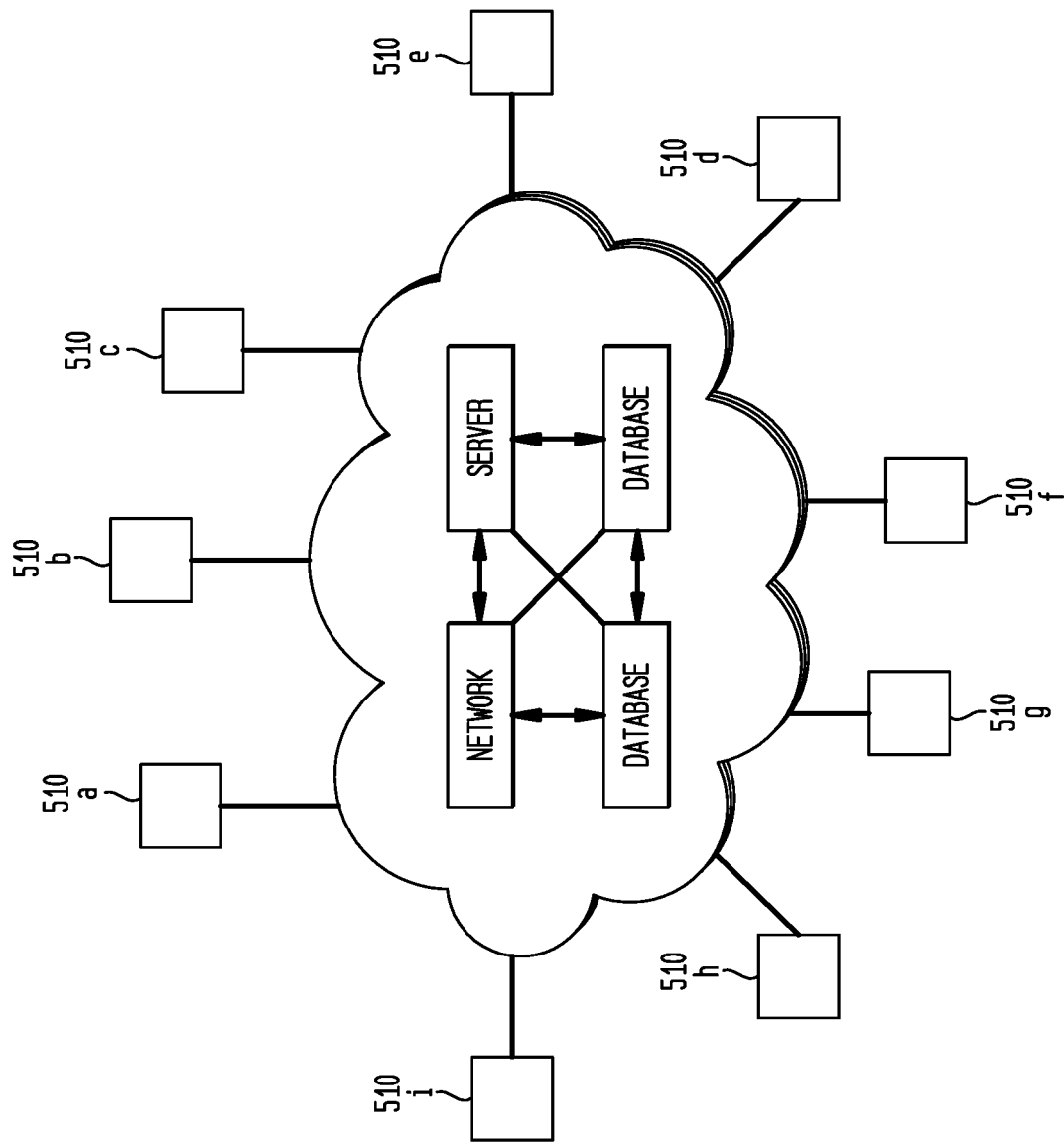
FIG. 4 is a schematic representation of a blockchain framework employed by the system of the present invention.

FIG. 4 illustrates the insurance underwriting process of the present invention, showing the interactions of the insurance brokers 20, the system 500 of the present invention, and the insurance company(ies) 40a-40n. As seen in FIG. 4, the insurance broker 20 essentially replaces the client, and the insurance companies' 40a-40n role becomes minimal in comparison to the underwriting analysis performed by the system 500 of the present invention.

In the embodiment shown in FIG. 4, a Blockchain platform built by a commercial source is integrated into the system 500 of the present invention to create a private permissioned Blockchain platform. One example of such a software system is sold under the trademark CHAIN THAT® (Registered trademark of ChainThat, Ltd., London, England for a software system platform for the management of an insurance business; this company is a provider of a blockchain-based system).

The distributed ledger system employed in embodiments of the present invention could be selected from one or more currently known blockchains, such as, but not limited to, a Bitcoin-based blockchain, an Ethereum-based blockchain, a blockchain developed for underwriting insurance or analyzing insurance claims, or a blockchain system developed specifically for this particular insurance risk assessment protocol. Examples of potentially usable blockchains include, but are not limited to, Hyperledger Fabric (from Hyperledger.org, The Linux Foundation), R3Corda (www.r3.com, based in New York, N.Y.), an IBM Blockchain (IBM Corporation, Armonk, N.Y.), Multichain (www.multichain.com, Coin Services, Ltd, United Kingdom), Hydrachain (an Ethereum-based blockchain platform), Ripple (www.ripple.com), BigChainDB (Blockchain Database, Berlin Germany), OpenChain (www.openchain.org), or IOTA (www.iota.org, The IOTA Foundation, Berlin, Germany). Other commercially available blockchain platforms, including open-source or proprietary blockchain platforms, developed by the present inventors or other parties, could also be used to operate system 500. As stated previously, the blockchain framework utilized in embodiments of the present invention is a private, permissioned network.

At the initial step 700, an insurance broker 20, acting on behalf of a proposed insured, creates an insurance proposal for the insured. This proposal is prepared either by the proposed insured, or the proposed insured in combination with the broker, in response to a questionnaire furnished by the insurer 40a-40n. Examples include, but are not necessarily limited to, directors' and officers' liability, personal injury liability, worker's compensation, negligence or malpractice liability, business interruption insurance, disaster coverage and cyberliability/cybersecurity coverage.

This insurance proposal is prepared using a series of forms generated by the system 500 of the present invention, and completed with the assistance of the proposed insured. These forms cold be generated electronically, displayed on a local computing device, smartphone or the like. During the step of creating the insurance proposal, at step 702, the broker then enters the data needed for the ten specific input fields (see below) into the rating engine 710 component of the system, and requests that the system 500 provide an insurance quotation.

The rating engine 710 includes one or more databases containing insurance underwriting criteria, risk assessment criteria, and may include one or more means of communication with external sources 680 (See FIG. 3). Such external sources could include databases maintained by one or more insurers with whom the broker maintains a business relationship, or could include one or more sources of business information, such as, but not limited to, a service from MOODY's®, STANDARD & POOR'S®, Advisen, CoreLogic, eBureau, the United States Census, or The United States Bureau of Labor Statistics. MOODY's® is a registered trademark of MIS Quality Management Corp, New York, N.Y. STANDARD & POOR'S® is a registered trademark of Standard & Poor's Financial Services, LLC, New York, N.Y. for financial and investment advisory services.

Other services such as Advisen Ltd. provide data, media and technology solutions for the commercial property and casualty insurance market. CoreLogic provides financial, property and consumer information, analytics and business intelligence to businesses and government. EBureau, a division of the Trans-Union Co., is a provider of predictive analytics and information solutions drawn from big data assets to help businesses acquire customers, manage risks and maintain customer relationships.

The rating engine 710 includes proprietary algorithms for risk assessment utilizing the data input at step 702 (data input at 702 triggers a data transfer to the rating engine and the AI system via a Blockchain platform through an Application Programming interface ["API"] [or a digital messenger]).

After a review by the rating engine 710, at 712 the AI System/rating engine makes one of three determinations: 714, to approve (accept) the proposed insured; 716, to reject the proposed insured, or 718, to keep the application pending.

If the decision is to approve (accept) the proposed insured, the application status is considered APPROVED 720, and the price for the insurance is determined and provided.

If the decision is to reject the proposed insured, the application status is considered REJECTED 722, and the risk assessment updated and will include comments provided by the rating engine.

If the decision is to keep the application pending 724, the risk assessment will be updated, and will include any comments provided by the rating engine.

At step 730 the system will update the risk assessment, and provide a price, which is then communicated to the broker at 740, whether this is for a policy that is being accepted, or one for which additional factors are to be reconsidered (the pending application 724).

After the approval step 720, the broker 20 is notified at 740 that the application has been approved. Although not shown in the Figure, the client 10 is also notified of the application's approval, and at 750 a decision is made either to accept or reject the offer of insurance. If the client rejects the offer, the process will generally end.

If the client 10 accepts the offer, a contract for the insurance is signed at 760, and at 770 the system 500 sends a real time notification to the insurance carrier. After the insurance contract has been signed at 760, the system 500 generates a binder at 780, and at 790 the system 500 and/or the broker 20 downloads the final insurance contract and then provides it to the client 10.

If the client has rejected the offer, the process will generally end. Should the client not accept the offer, and instead, seek to modify it, for example, by seeking less expensive coverage, or a higher deductible, the broker 20 can enter the modifications into the system 500, and start the process over again.

Blockchain Component

Embodiments of the present invention build upon the basic underwriting process described in FIG. 1. These embodiments (see FIG. 4) include the addition of secure data storage and access, using information stored on the distributed ledger (also known as a Blockchain) or associated databases stored on the cloud. Generally, a blockchain, or distributed ledger, is a database which is stored on a plurality of individual computer systems, or nodes 510 of a network. Certain embodiments of this distributed ledger system may store information or data that represents risks associated with a certain type of activity, for example only, a building that has an automatic sprinkler installed therein and is therefore considered a low risk when its owner applies for fire insurance. Another embodiment may store information or data that represents risks associated with a certain type of activity, another example being rankings of businesses having business ratings within a specific range, and the risks of a default on a payment associated with such a business rating. Each data set is stored as a block, and the blocks are stored together, albeit not all the data of any one blockchain resides on the same computer/node. This decentralization of data storage by the blockchain system is a factor that provides security to the system, because access to one node does not allow or provide access to the others should an intrusion occur at one or more nodes of the distributed ledger. As a further security protection, the data may be stored in an encrypted format, with only a limited number of individuals having access to the key necessary to unencrypt the stored data. Thus, the blockchain provides connectivity within this digital network, and by connecting all the parties in a real-time manner, as described in the paragraphs below, it establishes an Efficient COllaboration system (referred to herein as an "eco-system"), and which can provide a reliable insurance quote.

The blockchain facilitates communication in a digital insurance network because the brokers, insurers, claims administrators, and the operators of the system of the present invention collaborate by sharing information safely and in real-time. This enables the sharing of client data and external information with the AI platform within seconds, and producing a reliable insurance quote to clients within minutes (compared to multiple days and/or weeks involved using current underwriting practices). Using the combination of blockchain and AI, the human underwriting process is replaced by a pattern recognition process, which can reach decisions within minutes. The Artificial Intelligence component provides the code that carries out this pattern recognition process, and with its machine learning component, improves upon itself based upon inputs of new data and experiences.

The distributed ledger system employed in embodiments of the present invention could be selected from one or more currently known blockchains, such as, but not limited to, a Bitcoin-based blockchain, an Ethereum-based blockchain, a blockchain developed for underwriting insurance or analyzing insurance claims, or a blockchain system developed specifically for this particular insurance risk assessment protocol. In embodiments of the present invention, the blockchain system used is a private, permissioned network with restrictions on the number of users and their access to the network.

This distributed ledger system could utilize a single blockchain/distributed ledger that is configured to store all types of transactions therein, or the blockchain/distributed ledger could comprise a plurality of blockchain/distributed ledgers, in which each blockchain/distributed ledger is employed to store data/information that is indicative of a specific type of transaction. For example, a first blockchain could be configured to store the potential insureds' insurance request, and the criteria associated therewith, while a second blockchain could be configured to store a plurality of insurance policies, each insurance policy having specific insurance policy parameters, for example only, and not limited to, the policy number, named insured, date of issuance, coverage limits, and the like.

The distributed ledger could be stored in and/or on one or more computing nodes (e.g., node 510) of the distributed ledger system in complete or partial form. For example, it may be stored on a stationary computing device (for example, a desktop computer or terminal), a mobile computing device and/or an internet-enabled device. It is anticipated that any computing device can function as a node if it maintains a copy of the distributed ledger and is in communication with at least one other node 510 of the distributed ledger system.

The distributed ledger system could be publicly accessible (within the contours of a cryptographically secure architecture), and be distributed among a plurality of commercial computing devices (for example, computer servers), user computing devices (for example, desktop computers, laptop computers, tablet computers, smartphones, and/or the like.

In certain embodiments, the distributed ledger system is privately accessible (e.g., permissioned), and stored by one or more computing nodes controlled by a single entity (such as an insurance company or a broker), or a consortium of trusted entities (for example, participating brokers in a brokerage service network). In the latter networks, access to data/information stored in the distributed ledger is limited to users having defined credentials (for example, a passcode, password, private key and/or the like). In certain embodiments, the data/information stored in the distributed ledger system may be encrypted or otherwise protected against unauthorized access (e.g., read access and/or write access).

The substantive data/information stored in the distributed ledger system may be accessible using a private key to decrypt the stored data/information, or the stored data/information may be inaccessible based on data/information stored in the distributed ledger. For example, data regarding the annual revenue of the proposed insured may be stored in one or more privately distributed ledgers, which is only available to authorized users, such as underwriters, while other data, such as business information scraped from publicly accessible websites, is stored in a blockchain repository on the cloud (for example only, Amazon's AWS® or Microsoft's AZURE®). Any and all aspects of the blockchain framework, and any variations thereof, are contemplated as being within the scope of the claimed invention claimed.

In various embodiments, a new transaction/block in a distributed ledger may be linked to a transaction/block of one or more secondary distributed ledgers (not shown in the drawings). The secondary distributed ledger may be one or more side chains and/or one or more distributed ledgers. The secondary distributed ledger may be a public, private and/or a consortium distributed ledger. Additionally, the one or more side chains can memorialize or capture other information/transactions that is not captured by a primary distributed ledger. As such, the one or more side chains may run in parallel to other distributed ledgers but may still be linked to one or more of the transaction/blocks in a primary distributed ledger. In this way, each side chain may be a distributed ledger dedicated to capturing information that is not otherwise captured by the primary distributed ledgers. By way of example only, the one or more secondary chains may capture information and/or transactions associated with, such as, but not limited to, the business of the insured, the insured's key personnel, or financial reports filed with government authorities.

The distributed ledger network 500 depicted in FIG. 4 includes a plurality of nodes 510a-510i that are each in communication with one or more nodes 510a-510i over a network, such as the Internet. In accordance with the present specification, each node 510a-510i is a node of a distributed ledger network (FIG. 3) which is also a computing device. In some embodiments, and for public blockchain implementations, each node 510a-510i in the distributed ledger network 500 can operate as a peer to every other node 510a-510i of the distributed ledger network 510 such that no single node 510a-510i is more influential or powerful than any other node 510a-510i. Operations performed by nodes can include, among other things, validating transactions, verifying blocks of transactions, and adding records to an immutable database that is collectively maintained by the nodes 510a-510i. It is contemplated, however, that in some embodiments, a particular subset of the nodes 510a-510i can be specifically designated for performing a subset of or all node operations described herein. In this regard, as opposed to embodiments where each node is a peer with other nodes, some embodiments can employ specially-"designated nodes" (preferably for private blockchains or systems where centralization is not a concern) that perform a subset of, or all of, the described node operations.

Like other transactions, each node (or designated node) can communicate this verification to one or more neighboring nodes (e.g., other nodes in direct communication with the node or designated node) until a consensus of the nodes 510a-510i where required, or designated nodes of the distributed ledger network 100 have collectively verified occurrence of the defined conditions precedent. Based on a determination that the defined conditions precedent have been verified by the nodes, or a consensus thereof, of the nodes 510a-510i, the event or action defined by the contract can be executed.

In some embodiments, the system 500 can further include a server device, such as server 540. The server 540 can be in communication with one or more nodes 510 to send generated transactions to the one or more nodes 510, request and receive transaction status information from the one or more nodes 510, and/or request and receive Blockchain data from the one or more modes 510n, among other things. In some further embodiments, server 540 can include one or more computing devices, also described in accordance with FIGS. 3-4, whereby the one or more computing devices include a consensus module to operate as a node 510 (or designated node). Among other things, the server 540 can further provide one or more services, such as data storage services, web hosting services for one or more websites, user authentication services, certificate authentication services, backup services, data mining services, "cloud"-stored data or web search services, block explorer services, analytics services, and the like, or combinations thereof.

The set of insurance policies may comprise standardized insurance policies and/or customized insurance policies. The customized insurance policy may include an insurance policy that is dynamically created based on a requested criterion (referral in underwriting/risk selection). This may occur, for instance, if an insurance policy transaction was specifically generated and stored in response to a particular insurance request. The insurance policy may then reference the transaction associated with a request for insurance.

Artificial Intelligence ("AI") Component

The central concept of Artificial Intelligence ("AI") is that AI is a collection of techniques that allow computers to perform "intelligently".

Artificial Intelligence ("AI") is generally defined as advanced software that can simulate human thought processes in order to complete basic, frequently time-consuming tasks and generate relevant and accurate results in less time than could be done by manual analysis. In traditional computing, the computer is programmed to perform specific functions, based upon the rules that are defined and programmed into the system. Compared to traditional computing, where the programmers are supposed to explicitly design an algorithm with predefined rules, AI makes it possible for a computer to learn from experience and anticipate a user's behavior, adjust to new inputs, and perform "human-like" tasks.

Machine learning is a sub-set of artificial intelligence that enables a computer system to automatically explore, enhance and improve from different experiences without being specifically programmed to do so. It focuses on the development of computer systems that can access data and use it for themselves.

When an insurance policy is underwritten conventionally as illustrated in FIG. 1, the system returns a proposal, including costs for the insurance coverage being sought. As previously described, the insurance underwriting process (risk selection) has been a manual task performed by humans with a comprehensive knowledge of insurance coverages and an understanding of risk vs. reward in conducting insurance. The key breakthrough in our approach is the recognition that for small companies, the Management Liability risk selection process can be transformed into a pattern recognition problem (technical problem). The solution to this technical problem is provided by the AI system in embodiments of the present invention. The result of this solution is embodiments of the present invention will issue a complete policy document, along with the necessary insurance endorsements, once a broker accepts a quote and price from the AI system. The entire submission, quote and bind process will generally take less than 10 minutes, compared to the more traditional approach which can take as long as between 4-6 weeks.

As part of the underwriting process, the knowledge and experience of the human underwriter is integral to this process. In the traditional underwriting process, where it is determined that the proposed insured presents a risk, review of the application and its' associated factors by an underwriter may conclude that the system gave too much weight to "factor a" and not a sufficient weighting to "factor b", and the underwriter decides to offer insurance to the proposed insured at a rate that would be appropriate for the type of risk. The Artificial Intelligence component is an additional element of the underwriting system, and works in conjunction with the system to improve the results it generates, and incorporating the knowledge of underwriters, teaches the system to be able to recognize situations where an additional review is necessary, to then make the necessary changes, and present a more "correct" result, that is, to reduce the risk, or to completely reject it. This process, in turn, accelerates the decision-making process, without the variations that may be attributable to variables such as differences in the knowledge of underwriters, their biases etc.

Description of Machine Learning Algorithm

Figure 5:
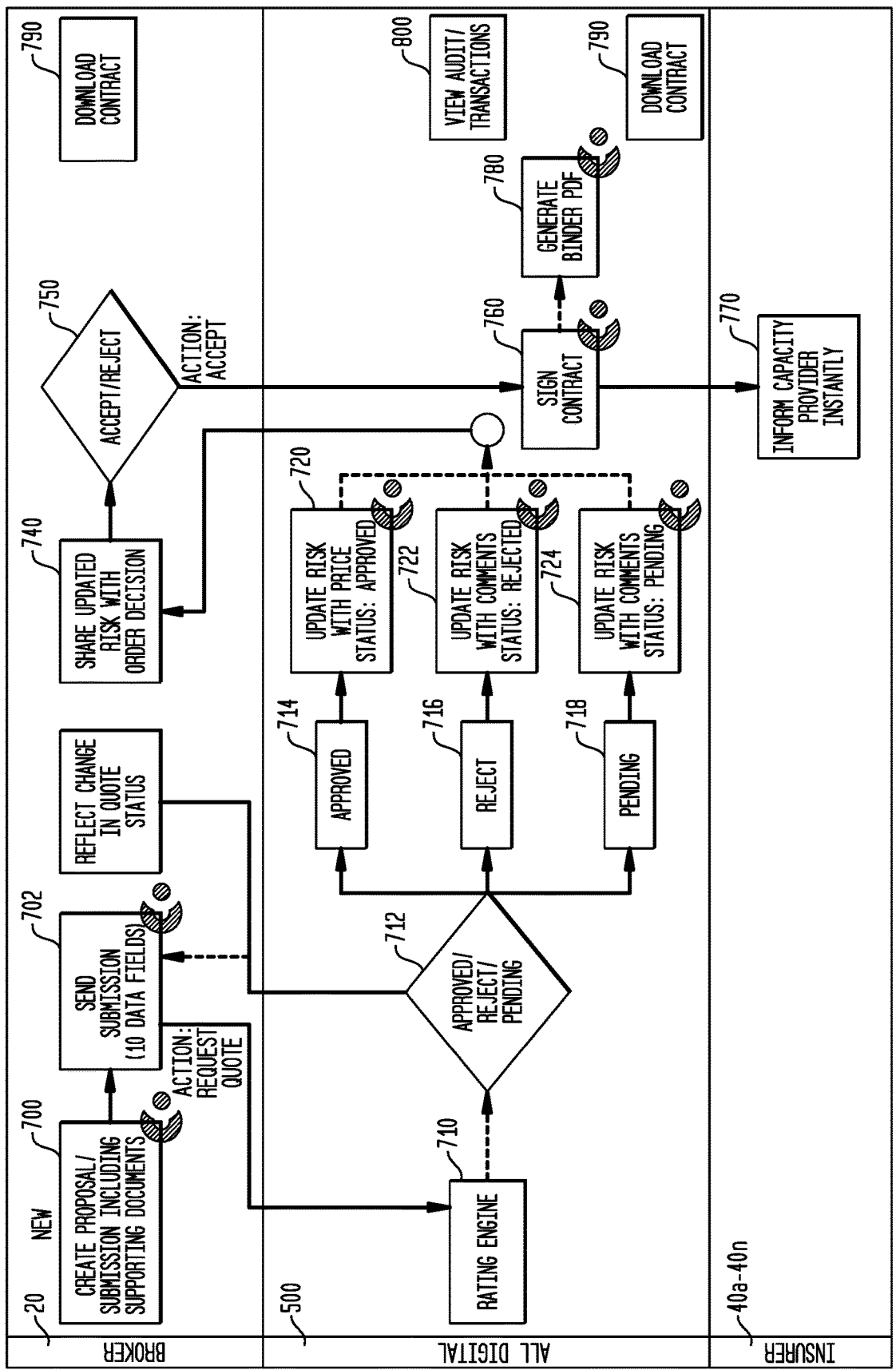
FIG. 5 is a flow chart of how an embodiment of the present invention is utilized to underwrite an insurance policy, and illustrates the actions of the insurance broker, the management liability risk management system of the present invention, and the insurer.

As has been described in regard to FIG. 5, it is the Risk Selection ("RS") and Price Determination ("PD") elements that are the end points of the underwriting system. Analysis of the data furnished by the proposed insured (as well as the data from external sources) determines the Risk Selection, which in turn is employed by embodiments of the system of the present invention to compute the end-result: Price Determination.

Once the questionnaire responses have been entered into system 500 by the broker 20, that data is transferred to the AI Component 520 of the system.

Because of the use of both blockchain technology, and artificial intelligence, an insurance underwriting process that used to take between 4-6 weeks is reduced to a risk selection process that completed within a time period ranging from 1 minute to 2 hours. In some embodiments, the risk selection process is completed within a time period ranging from 2 minutes to 1 hours, and in other embodiments the risk selection process is completed within a time period ranging from 2 minutes to 10 minutes.

Training of the AI Component

The AI component employed by the system is responsible for providing rate quotes and an insurance decision upon the receipt of a request through the blockchain platform initiated by a broker 20 (FIG. 5).

A set of questions designed by experienced underwriters are used to take input from the customers. The AI module also uses input from multiple other data sources such as the Moody's Analytics data, S&P Capital 10, Advisen, social media and web information about the customer and the organization.

To initiate the training process of the AI module for quotes and decisions, a set of hard decisions on some of the answers on the aforementioned questions were used. (A hard decision is one that is programmed so that it cannot be overridden by the system.)

This segment of the AI system was trained using 50,000 simulated data points.

The rating algorithm used to determine the pricing model of the AI module was provided with a set of proprietary rating factors. In some embodiments, businesses will require state insurance department approval prior to issuing policies. In this example, the state referred to is the State of New Jersey. The "state approved" factors to be included in any particular embodiment will be obtained from factors (that are filed by an insurance carrier) from whichever state(s) the system is being employed in. In certain instances, where a broker may handle matters for more than a single state, for example, New Jersey and New York, or New Jersey and Pennsylvania, or similar multi-state border situations, embodiments of the present invention may include questionnaires and underwriting guidelines that are approved by more than one state, but the appropriate state-specific factors will be used for each client in the underwriting process.

This embodiment can be applied to businesses that use factors that do not require state insurance department approval.

After the system's initial training, the AI module is updated by the underwriter's judgment on the decisions made and the predicted prices. The training model follows the branch of artificial intelligence which is known as the "Human in the loop" AI, where the humans' designed rules were used to initiate the system and then the human experts are used to fine-tune the predictions of the system. This model teaches the AI module to emulate an expert underwriter for the process of risk selection and pricing, and the AI module is designed to improve its' decision-making processes further as more data is accumulated.

Because of the integration of the AI platform 520 into the system of the present invention, the overall insurance writing process becomes a dynamic process, because the system learns from the interactions of the brokers 20 with the system. As described previously, where, if for a certain set of input parameters the resulting PD is considered too high, the AI component 520 will know that in the future when a similar RS data set is input, the system will generate a lower PD or reject the risk.

There are factors in addition to the risk characteristics obtained from the proposed insured that are used in the insurance underwriting process, and some of these are referred to as "hard" decisions (defined in a previous paragraph). The underwriters for a particular type of insurance product will create a set of hard decisions to be used for the underwriting process, and such decisions will be entered into the system. One example of such a hard decision is, for example, whether the proposed insured is a business which involves *cannabis*, a substance currently illegal under the laws of the United States, but considered legal under the laws of several of the states. If the proposed insured states that they are involved in a *cannabis* business, that proposed insured would be rejected based on the hard decision. Once the set of hard decisions has been created, a dataset simulation is run in order to generate a sufficient number of synthetic datapoints to cover all the hard decisions. This simulated dataset is then entered into the AI Module 520 to learn the hard decisions, and to use them when data is entered into the system of the present invention.

Furthermore, the underwriters will also determine a list of "external factors", not necessarily included within the questionnaire, but which are relevant to the business concerning both risk assessment and price determination. These external factors are considered to be "soft decisions", which, when entered into the system of the proposed invention via proprietary databases or external data sources, can be adjusted and will affect the RS and PD determined by the system.

Rating Factors

Generally, an insurance company will employ a standard form for underwriting insurance, although there are variations from company to company, and variations even within organizations. The basic tenets are generally the same—to determine the potential risks, and determine a price that will provide coverage to an insured, a profit margin for the insurance carrier, and reserves to cover potential claims.

In the present invention, one potential series of questions is aimed to assess the type and size of a potential risk. These questions, or rating factors, take into account the following:
  a. What is the revenue of the potential insured? A company's annual revenue is an indicator of the size of the company, and larger companies tend to be more complex than smaller companies, and so the larger companies are associated with a larger risk in providing management liability insurance.
  b. What is the number of employees? The total number of employees is also an indicator of the size of the company. Depending upon the particular operation of the company, for example, a manufacturing firm or a warehousing firm, or a brokerage company, number of employees as well as pay scale is a predictive variable in determining management liability risk profile. Consequently, these factors also contribute to the overall risk assessment.
  c. What is the industry or business? Once the industry or business is identified, that data can be associated with a list of risk factors that are known to be associated with the industry. Such industry-specific risks can be obtained from such public databases as MOODY'S, Advison, S&P Capital IQ or others discussed in prior sections of this specification.
  d. What is the ownership structure of the proposed insured? Is the proposed insured a privately held organization, or a public company? Is the organization run by one or two individuals, or is there a board of directors? What is the nature of the board: are the directors all from within the organization, outside the organization? Are the owner(s) of the organization, or those who have controlling financial interests, serving on the board?
  e. What is the claim history of the potential insured? Has the potential insured been involved in other insurance claims in the past, and what was the nature of such claims? The past claims behavior of a potential insured is known in the industry to be a factor that is very predictive that claims will be made in the future.
  f. What is the credit score/credit rating of the business? This data is generally obtained through a business service such as Dun and Bradstreet. Among the information that Dun & Bradstreet provides in a credit report is an overall rating of the business ("D&B Rating"), which takes into account numerous business and legal factors, including such things as Business Risk, Failure Score (formerly the Financial Stress Score), and a Delinquency Rating. The business risk ranges from Low Risk, Low to Moderate, Moderate, Moderate to High, and High Risk, all of which can be factored into whether the potential insured will be a good risk. The Fair Isaac Company provides what is referred to as a FICO® Score (Registered trademark of Fair Isaac Company, Minneapolis Minn. for consultation services in the field of financial information, namely providing credit scoring services), which is for the credit ratings of consumers, and which for businesses can only be used in very limited circumstances.
  g. How long has the potential insured been in business? The number of years in business is used to differentiate start-up organizations from older, long-run companies which are considered to be stable. In general, there are more risks associated with organizations during their early stages, and risks associated with inexperienced owners.
  h. How many locations does the organization have? If the ownership has expanded to a number of locations, it is possible that there might not be direct oversight of the organization by the owners on a regular basis, thus leading to a greater risk; and
  i. Number of employees in California. California is a state known to be employee-friendly, and has the potential to expose employers there to risks of wage and hour violations, Reinforcement Learning Reinforcement Learning is a training process for the AI system, and will be used as an element of the rating factors for the underwriting process. After policies have been issued and claims start to be made and paid, losses will occur. The extent of the loss will be used to develop a rewards/punishment system which can act as a further learning tool within the machine learning environment. For example, certain types of losses are accepted by the industry as "routine" losses, perhaps because they are not considered extensive. Such "routine" losses will be assigned a specific rating factor, for example, a negative number. Other, more "egregious" losses, such as those that require a high payout and that could have been avoided through a more rigorous risk selection process, also receive a negative number, only much larger than that for the "routine" losses. Those losses considered to be "truly accidental" will be assigned a zero value. These reinforcement learning data factors will be input into the insurance underwriting system of the present invention, and used as a part of the process to improve risk selection.

As has been described, embodiments of the present invention are intended to be used for the insurance underwriting process. Other embodiments can be used for processing of a claim made under a policy that has been generated using an embodiment of the present invention. Similar to the underwriting process, in which the criteria submitted by the proposed insured is reviewed and compared to risk assessment data, information relevant to a claim, such as the date/time of an incident, the parties involved, and the facts underlying the claim could be submitted to an embodiment of the system, utilizing one or more databases of the current embodiment, and one or more databases of the alternative embodiment, relating to claims criteria, from the particular insurance carrier involved, can be reviewed, and a proposed resolution proffered. Given that the insurance application data may have been stored within a blockchain, and the insurance carrier's record retention policy, it is possible for the insurance carrier to review the insured's application, and determine if there defects within the insureds' initial application that may lead to a reason to deny the claim.

Example 1. Employment Practices Liability Insurance ("EPLI")

This type of insurance generally provides coverage for wrongful acts that arise from the employment process. Under an EPLI policy, the most frequent types of claims include, but are not necessarily limited to, sexual harassment, discrimination, wrongful termination and retaliation.

In this example, accumulated data shows that in a medical practice setting, where the physician is a male, there is a certain frequency of claims for sexual harassment by the office staff, which generally is mainly female. In a comparable setting involving two male physicians, the frequency of claims for sexual harassment is three times greater than that for the general population.

The question is whether if a third physician is added to the practice, what will the effect be on the frequency of claims for sexual harassment? Will the addition of a third male physician result in an increased frequency of claims? Will the addition of a female physician as the third physician result in a decrease in the frequency for sexual harassment claims?

The AI and machine learning components of the system of the present invention will assist in making this determination, by reviewing new data as they are reported, past claims data from within the company, and/or industry if available, and by web scraping, to find relevant information from various published sources.

Example 2. Dispute Concerning Wage and Hours Practices

These disputes generally fall under the EPLI insurance, and often involve staff who are promised a wage of $ x/hour, but are then paid, for example, $ 0.75x/hour (mainly achieved by not adequately paying for overtime). By reviewing data based on the dates of the claim, the location, and the type of business involved and its "typical" workforce, the system of the present invention can determine whether such a claim is justified, and how to settle it.

Example 3. Factors for Consideration for a Fire Insurance Policy

Among the factors that are normally taken into consideration during the underwriting process are:
type of structure sought to be insured;
age;
type of construction: wood-frame v. steel frame;
presence/absence of a sprinkler system and/or fire detection system;
presence of fire alarms within structure;
standpipes for fire company use if a tall building;
typical use of structure: office v. factory v. heavy manufacturing; use of chemicals and/or other flammables within building;
number of entrances/exits/fire exits.

Although embodiments of this invention have been described with a certain degree of particularity, it is to be understood that the present disclosure has been made only by the way of illustration, and that numerous changes in construction and arrangement of components may be resorted to without departing from the spirit and scope of the invention.

I claim:
1. A method for the management of risk selection, the method comprising the steps of:
   inputting an application for insurance for a proposed insured into a node of a computer system, the computer system comprising a plurality of databases of properties of known insureds, the application comprising a plurality of data relating to the proposed insured;
   comparing the plurality of data relating to the proposed insured to a plurality of data comprising risk factors and risk levels;
   determining the risk level for the proposed insured, based upon the inputted application; and
   determining whether to offer an insurance policy to the proposed insured, wherein the computer system further comprises:
   a plurality of nodes that are input sources;
   a plurality of insurance company computer systems, the insurance company computer systems being in electronic communication with one or more of the nodes;
   a plurality of broker company computer systems, the broker company computer systems being in electronic communication with one or more of the nodes; and
   wherein the plurality of databases further comprises:
   a database comprising information specific to one or more insurance companies;
   a database comprising information specific to one or more businesses other than insurance companies;
   a database comprising a plurality of risk factors and risk classes, the risk classes being determined by a range of amounts previously paid to an insured, the risk classes being defined as low risk, medium risk, and high risk, the low risk class characterized by the lowest range of payments, the high risk class characterized by the highest range of payments made to an insured, and the medium risk class characterized by a range of payments that are between the payments of the low risk class and the high risk class;
   a database comprising a plurality of business characteristics;
   a database comprising a plurality of claims data;
   a database comprising a plurality of insureds data;
   a database comprising a plurality of pricing data;
   a database comprising a plurality of actuarial information;
   a database comprising a plurality of newspaper data;
   a database comprising a plurality of business publications data; and
   a database comprising a plurality of public source data,
   wherein the one or more of the databases are stored on a blockchain, and data obtained during the method for the management of risk selection added to the blockchain, enabling the method for the management of risk selection to be completed within a time period ranging from about 1 minute to about 2 hours; and
   the method further comprises the step of training the computer system to evaluate risk, including the step of updating one or more of the databases, at periodic intervals, with new risk factors data, new business characteristics data, new claims data, and new insureds data, whereby the computer system is taught to make a decision whether to offer insurance to the proposed insured based on the evaluated risk, without requiring the input of an insurance underwriter;
   and wherein the step of training the computer system to evaluate risk further comprises the steps of:
   providing a plurality of rules for evaluating risk, the rules for evaluating risk including rules for approving insur- ance, declining insurance, and pending insurance approval, the rules for evaluating risk prepared by an insurance underwriter;

providing a plurality of insurance company data records; and providing a plurality of data-driven inferences;

generating a synthetic dataset for training an Artificial Intelligence (AI) system from the rules for evaluating risk, the insurance company data records, and the data driven inferences;

using the synthetic dataset being to train the AI system to evaluate risk, creating a trained risk assessment module; and further training the trained risk assessment module to underwrite insurance, utilizing a second dataset based on review of decisions and input from an insurance underwriter, the second dataset comprising a plurality of actual insurance company records of evaluated risk, the insurance underwriter determining an accuracy rate that the evaluated insurance risk is similar to the second dataset, thereby allowing the computer system to evaluate risk without further review by the insurance underwriter.

2. The method as described in claim 1, wherein the insurance company computer system further comprises regional demographic data, industry segment and sub-segment data, occupational data, current market trends data, and city and zipcode data.

3. The method as described in claim 2, wherein the plurality of computers are in real time electronic communication with each other, the electronic communication being either a wired or a wireless connection, and with one or more of the connections selected from the group consisting of an electronic network, a direct connection to the insurance company computer system, the world wide web, the Internet and a virtual private network ("VPN").

4. The method as described in claim 3, wherein the node is selected from the group consisting of a computer terminal, a portable computer, a laptop computer and a smartphone.

5. The method as described in claim 4, further comprising the step of searching the internet to obtain additional information relating to the proposed insured to incorporate into one or more of the plurality of databases, followed by the step of comparing the obtained information with data in one or more of the plurality of databases, to determine a risk class for the proposed insured.

6. The method as described in claim 4, further comprising the step of comparing the risk class for the proposed insured to the database of pricing data, and determining a price for the proposed insured.

7. The method as described in claim 6, wherein if the proposed insured is determined to be in the low risk class, the proposed insured is offered an insurance policy.

8. The method as described in claim 6, wherein if the proposed insured is determined to be in the high risk class, the proposed insured is not offered an insurance policy.

9. The method as described in claim 6, wherein if the proposed insured is determined to be in the high risk class, and prior to the step of determining whether or not to offer an insurance policy, the method further comprises the step of seeking additional information relating to the proposed insured.

10. The method as described in claim 6, wherein the management of risk selection process is completed within a time period ranging from 2 minutes to 1 hour.

11. The method as described in claim 10, wherein the management of risk selection process is completed within a time period ranging from 2 minutes to 10 minutes.

12. The method as described in claim 1, further comprising the step of verifying the correctness of the one or more updated databases.

13. The method as described in claim 12, wherein the step of updating one or more of the databases, at periodic intervals, further includes previously unincluded historical data for risk factors, for business characteristics, claims, and other insureds, thereby providing the computer system an improved ability to make decisions whether to offer insurance to the proposed insured based on the evaluated risk.

14. The method as described in claim 4, wherein the method is used for underwriting insurance, chosen from the group consisting of employment practices liability insurance ("EPLI"), wage and hours practices disputes, discrimination disputes and harassment disputes.

15. The method as described in claim 1, further comprising the step of updating the computer system at periodic intervals, with a plurality of additional examples of situations being characterized as a good risk and a plurality of additional examples of situations being characterized as a high risk, based upon data from recent claims provided by the insurance company, and repeating the training step and the updating step at periodic intervals, and repeating the training step one or more additional times wherein the percentage of risks identified keeps increasing, such that the decisions made by the computer system maintain a percentage that is comparable to the percentage of decisions made by an insurance underwriter, the decisions having been made by the computer system in the absence of the insurance underwriter.

* * * * *